May 30, 1967 W. K. GULICK 3,322,281
FILTER ASSEMBLY HAVING PLURAL CHECK VALVES
Filed Aug. 7, 1964 2 Sheets-Sheet 2
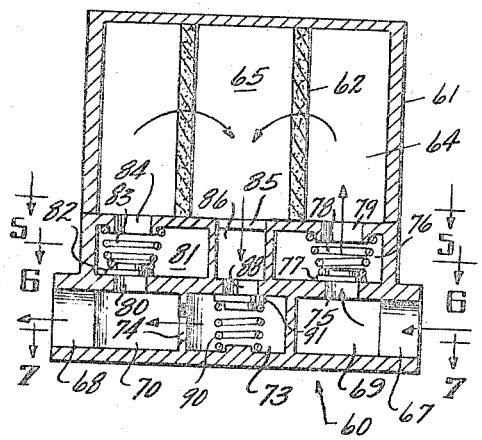
Fig. 4
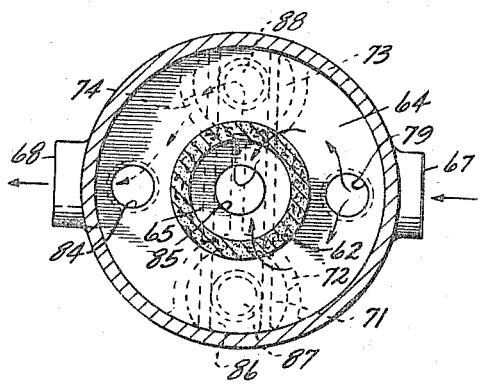
Fig. 5
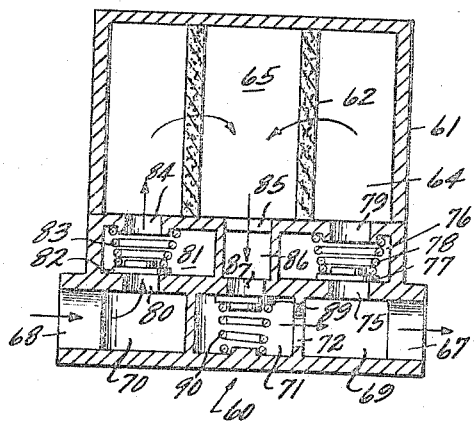
Fig. 8
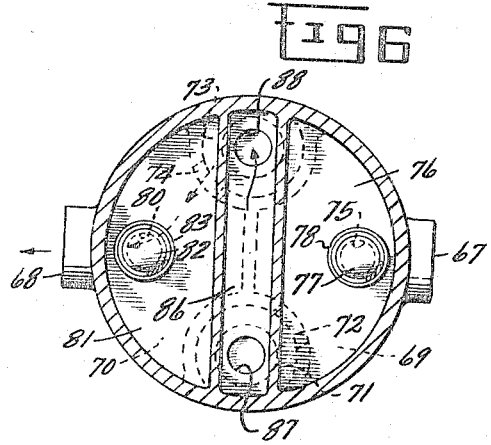
Fig. 6
Fig. 7
INVENTOR.
WILLIAM K. GULICK
BY Gerald P. Moore
ATTORNEY United States Patent Office 3,322,281
Patented May 30, 1967

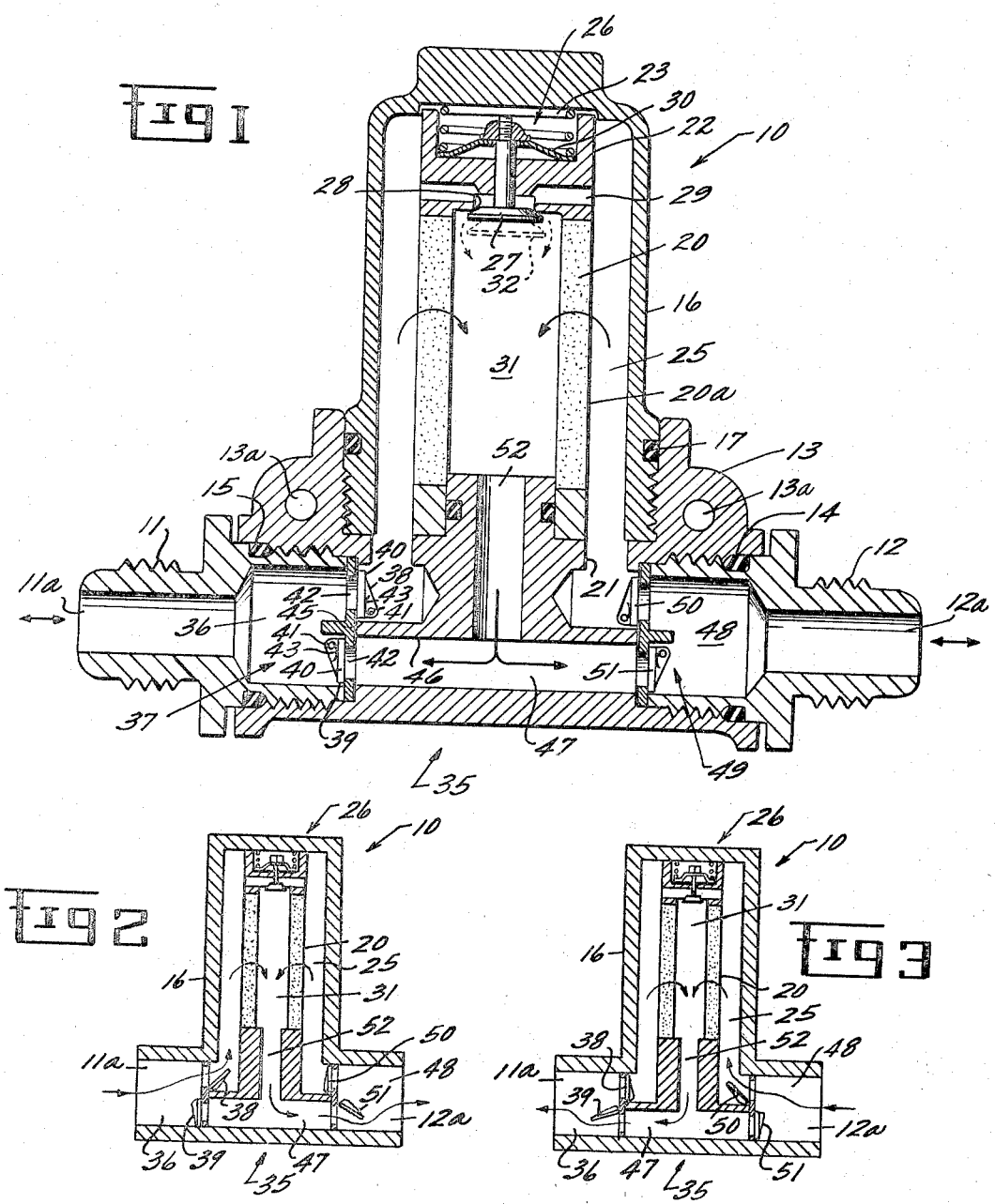

3,322,281
FILTER ASSEMBLY HAVING PLURAL
CHECK VALVES
William K. Gulick, Glendale, Ohio, assignor to General
Electric Company, a corporation of New York
Filed Aug. 7, 1964, Ser. No. 388,160
1 Claim. (Cl. 210—134)

This invention relates to a flow control apparatus and more specifically to a means for controlling fluid flow through unidirectional flow devices such as filters so that the flow is in the optimum direction regardless of the direction of flow through the system.

In fluid systems such as servo systems or the like, it is frequently necessary to incorporate filters, heat exchangers, coolers, hydraulic motors or the like which of necessity must have fluid flow therethrough in one direction. However, where such are incorporated in systems where momentary or long term flow may be bi-directional it is important that means be provided to control the flow so that it is unidirectional through the apparatus itself even though the flow is reversed within the system.

For instance in servo systems where hydraulic fluid is supplied to an actuator through conduits the flow may be designed to be in one direction only, and frequently filters must be incorporated in the conduits to prevent any contaminating matter in the fluid from reaching the actuators since it might cause an actuator malfunction. However in such systems it is possible that pressure surges may cause momentary flow in the opposite direction and where the flow has been unidirectional through the filter such a counter flow could result in the contaminating material previously separated from the fluid by the filter being injected back into the fluid in a concentrated form since the filter would be "back washed" causing the contaminating material to be swept away. The subject invention prevents such occurrence in the fluid system by providing the combination of the filter device and a unidirectional flow means which assures that flow through the filter will always be in one direction regardless of the direction of flow through the conduit system.

It is therefore an object of this invention to provide a flow device in combination with a flow valve means for directing the fluid through the device in a unidirectional manner irrespective of the direction of the fluid flow through the fluid system connected to the device.

It is another object of this invention to provide a flow control apparatus combining a filter and a flow valve means wherein the valve provides unidirectional flow through the filter irrespective of the direction of the fluid flow through the fluid system to the apparatus.

In accordance with these and other objects, a preferred embodiment of the invention provides a flow control apparatus comprising a flow device such as a filter with a combined unidirectional valve means arranged to act responsive to pressure drops across the flow device in a manner to allow only unidirectional flow through the device irrespective of the direction of fluid flow in the system connected to the apparatus.

Other objects and many of the attendant advantages of this invention will be readily appreciated as the same becomes better understood by reference to the following detailed description when considered in connection with the accompanying drawings, wherein:

FIG. 1 is a cross-sectional view of one embodiment of the invention,

FIG. 2 is a representative cross-sectional view of FIG. 1 showing fluid flow therethrough in one direction, FIG. 3 is a representative cross-sectional view of FIG. 1 showing fluid flow in the opposite direction, FIG. 4 is a cross-sectional view of a second embodiment of the invention showing fluid flow in one direction, FIG. 5 is a cross-sectional view along the line 5—5 of FIG. 4, FIG. 6 is a cross-sectional view along the line 6—6 of FIG. 4, FIG. 7 is a cross-sectional view along the line 7—7 of FIG. 4, and FIG. 8 is a cross-sectional view of the embodiment of FIG. 4 showing fluid flow in the opposite direction.

Referring now to the drawings, FIG. 1 illustrates flow device which in this instance is a filter 10 through which flow passes from the fittings 11 and 12 which may be attached into any suitable fluid flow system to deliver fluid into either fitting and out the other. Such filters are frequently incorporated in aircraft hydraulic systems where fluid must be supplied to mechanisms such as actuators for instance, for actuation of certain components of the system to prevent the passing of foreign contamination in the hydraulic fluid to the actuator or other mechanisms. The filter itself consists of a filter head 13 into which are screwed fittings 11 and 12 with seals 14 and 15 sealing the joint between the filter head and the fittings and with filter bowl 16 screwed into the filter head for enclosing the filter element 20. A seal 17 is provided for sealing between the filter head and the filter bowl. The filter bowl is detachably supported on the filter head to allow insertion of the filter element 20 which is supported between a pedestal 21 within the filter head and a cap 22 which is spring biased by spring 23 extending between the cap and the filter bowl 16.

Such filter elements are universally used and are supported by fasteners extending through mounting holes 13a in the filter head. In the normal operation of such a filter the fluid may enter the cavity 25 formed between the filter bowl 16 and the filter element 20 to thereafter flow through the filter element, which generally is a sintered or other type material having small interstices through which the fluid may pass. The small interstices prevent the passage of foreign matter carried by the fluid, leaving such foreign matter on the surface 20a of the element. The preferred flow is generally from the outside to the inside of such a cylindrical shaped filter since greater surface area exists on the outer side providing a greater holding surface 20a for any foreign material removed from the fluid. In the event the filter becomes clogged or will no longer pass sufficient amounts of fluid due to the collection of foreign matter on the surface 20a of the filter element, a relief valve 26 is provided comprising a valve member 27 and a valve seat 28 formed in the cap 22 which includes passages 29 positioned such that when the relief valve is open fluid may pass through the passages 29 and past the valve member 27 into the center of the filter to bypass the filter element. A spring 30 is provided to bias the valve 27 against the valve seat 28, however if the filter becomes sufficiently clogged to cause a predetermined pressure drop between the cavity 25 external to the filter and the cavity 31 internal to the filter, the fluid pressure acting on the valve will create a force sufficient to overcome the force of the spring 30 to cause valve 27 to move to the dotted position 32 and allow the bypass flow.

To provide unidirectional flow through the filter element, the present invention provides a combined valve system 35. In this embodiment a fluid opening 11A of fitting 11 connects with a cavity 36 with the opposite end of the cavity closed by a valve assembly 37 comprising unidirectional check or flapper valves 38 and 39 opening in opposite directions. Each check valve consists of a valve member 40 pivotally supported by a support pin 41 over the valve opening 42 to allow fluid flow in only one direction through the valve opening 42, with the valve member 40 biased into the closed position by a spring 43 extending between the pin 41 and the valve member 40. A face seal 45 fits between the valve assembly 37 and a wall 46 of the filter head to prevent passage of fluid between the cavity 36 and a fluid passage 47 formed within the filter head. Similarly opening 12A in fitting 12 connects with cavity 48 which includes a valve assembly 49 having flapper valves 50 and 51 controlling fluid flow into cavities 25 and 47 respectively, with the valves allowing flow in opposite directions. Similar to valves 38 and 39, valves 50 and 51 each comprise a valve member 40 pivotally supported by a support pin 41 over a valve opening 42 so as to allow fluid flow in only one direction through the valve opening 42, with the valve member 40 biased into the closed position by a spring 43 extending between the pin 41 and the valve member 40.

As illustrated in FIGS. 2 and 3, fluid entering opening 12A in the fittings will flow into cavity 25 through valve 50 since fluid pressure in cavity 48 will exert a force to open the flapper valve. Flapper valve 51 will be held closed by the fluid pressure within cavity 48. The fluid will thereafter flow from cavity 25 through the filter element 20 into cavity 31, passages 52 and 47. Fluid pressure in cavity 48 acting on valve member 51 will exert a greater closing force on the valve member than fluid within passage 47 to hold the valve 51 closed. The greater force is due to the fluid pressure in cavity 48 being greater than that in passage 47 since a pressure drop has occurred by passage of the fluid through the filter element 20. Also a greater surface area of the valve member of valve 51 is exposed to the fluid of cavity 48 than the fluid of passage 47 and the spring pressure is aiding in holding the valve member closed.

The fluid will thereafter open valve 39, a lower pressurized fluid exists in cavity 36, to allow fluid flow out of opening 11A in fitting 11. If fluid enters fitting 11 it will flow through valve 38, cavity 25, filter element 20, cavity 31, passage 52, passage 47 and valve 51 out through cavity 48 and fitting by the same reasoning. In either case fluid passes through the filter element in the same direction regardless of the direction of fluid flow to the valve system.

In FIGS. 4 through 8 is illustrated a second embodiment of the invention comprising a filter head 60 to which is attached a filter bowl 61 enclosing a cylindrical shaped filter element 62 dividing the internal cavity formed by the bowl 61 and filter head 60 into cavities 64 and 65. The filter head 60 includes a series of fluid cavities having connecting ports with cooperating poppet valves controlling fluid flow therethrough. Referring to FIG. 7 fluid may enter the filter head 60 through either port 67 or 68 leading to cavities 69 and 70 respectively. Cavity 71 is connected by port 72 to cavity 69 and cavity 73 connects with cavity 70 through port 74.

Referring further to FIGS. 4, 5 and 6, port 75 connects cavity 69 with cavity 76 with fluid flow through the port controlled by valve 77 spring loaded by spring 78. Port 79 connects cavity 76 to cavity 64. Similarly port 80 connects cavity 70 with cavity 81 with a valve 82 spring loaded by spring 83 controlling fluid flow through the port. Port 84 connects cavity 81 with cavity 64. Connecting with cavity 65 internal to the filter element 62 is a port 85 leading to the elongated cavity 86 which connects with cavity 71 by port 87 and cavity 73 by port 88. Poppet valves 89 and 91 spring loaded by springs 90 control fluid flow through ports 87 and 88.

As explained heretofore the overall purpose of this apparatus is to provide unidirectional flow through the filter device even though there is bi-directional flow through the fluid system allowing fluid to enter the port 67 or 68. In the instance illustrated FIG. 4 where fluid enters port 67 and passes into the cavity 69, fluid may pass through port 75 to cavity 76 with the fluid pressure forcing the valve member 77 away from the port 75 to allow fluid flow into the cavity 76 and on through port 79 into the cavity 64 surrounding the filter 62. The fluid thereafter passes through the filter element 62 into the cavity 65, down through the cavity 65 and the port 85 into the elongated cavity 86, through the port 88, and past poppet valve 91 into cavity 73 to flow outward through the opening port 74, cavity 70 and port 68 to the fluid system. It may be seen that when fluid enters into the inlet 67 the flow is from cavity 64 to cavity 65 through the filter element 62 in the flow direction desired. Furthermore fluid within the cavity 64 may not pass through cavity 81 and out the port 80 since the fluid pressure opposes the opening of the valve 82 closing the port 80 since there exists a fluid pressure drop across the filter element and therefore between the cavity 81 and the cavity 70. Similarly fluid entering cavity 71 through port 72 from cavity 69 merely acts to hold valve 89 closed preventing fluid flow in that direction.

Referring now to FIG. 8 where the fluid enters the inlet 68 as indicated by the arrows, the fluid flows into the cavity 70 through the port 80 causing the opening of the valve member 82 to thereafter pass through the cavity 81, the port 84, and into the cavity 64 where it may flow through the filter element 62 to the cavity 65, down through the port 85, elongated cavity 86 and into the cavity 71 by the opening of the poppet valve member 89 in the port 87 to thereafter flow out through the port 72, the cavity 69 and the outlet 67 as indicated by the arrows. When the fluid enters the cavity 70 it may not thereafter flow through the cavity 73 and up into the center of the filter since the force of the pressured fluid biases the valve 91 closed. Similarly, flow into the cavity 76 biases valve 77 closed to prevent flow through port 75.

It may be seen that no matter which embodiment or flow valves are used, there is provided unidirectional flow through the flow device even though bi-directional flow exists within the fluid system. While particular embodiments of the invention have been illustrated and described, it will be obvious to those skilled in the art that various changes and modifications may be made without departing from the invention and it is intended to cover in the appended claim all such changes and modifications that come within the true spirit and scope of the invention.

What is claimed as new and desired to be secured by Letters Patent of the United States is:

A filter assembly for use in a bidirectional fluid flow system, said filter assembly comprising:
  a casing having a pair of openings for bidirectional passage of fluid therethrough, one being an upstream opening and the other being a downstream opening, dependent on the direction of fluid flow through the system,
  a chamber formed in said casing,
  a filter element disposed in said chamber and separating inlet and outlet chambers therein,
  inlet passageways respectively providing flow paths from said openings to said inlet chamber,
  check valves respectively disposed in each of said inlet passageways for selectively permitting flow from the upstream opening to the inlet chamber and preventing flow from the inlet chamber to the downstream opening whereby fluid selectively flows from the upstream opening to said inlet chamber and through said filter element to said outlet chamber thereby causing a decrease in pressure as the fluid flows through said filter element,
  outlet passageway means providing flow paths from said outlet chamber to said openings,
  check valves respectively disposed in said outlet passageways, selectively permitting flow only from said outlet chamber to said openings, the check valve in the outlet passageway leading to the upstream opening being positively maintained closed by the pressure drop across said filter element,
  whereby there is unidirectional flow of fluid through said filter element regardless of the direction of fluid flow through the system.

References Cited

UNITED STATES PATENTS

| | | | |
|---|---|---|---|
| 2,183,616 | 12/1949 | Korte | 210—130 |
| 2,605,902 | 8/1952 | Curtis | 210—423 |
| 3,178,022 | 4/1965 | Balogh | 210—136 |
| 3,256,908 | 6/1966 | Mann | 137—512 X |

FOREIGN PATENTS 313,275  12/1933  Italy.

REUBEN FRIEDMAN, *Primary Examiner.*

F. SPEAR, *Assistant Examiner.*